United States Patent
Lin et al.

(10) Patent No.: US 7,052,765 B2
(45) Date of Patent: May 30, 2006

(54) METHOD FOR MANUFACTURING ANTIBACTERIAL POLYESTER MASTER BATCHES AND FIBERS BOTH CONTAINING NANO-SILVER PARTICLES

(75) Inventors: Jia-Peng Lin, Sinjhuang (TW); Yu-Chi Tseng, Miaoli (TW); Huan-Sheng Chien, Taoyuan Hsien (TW)

(73) Assignee: Taiwan Textile Research Institute, Taipei Hsien (TW)

( * ) Notice: Subject to any disclaimer, the term of this patent is extended or adjusted under 35 U.S.C. 154(b) by 0 days.

(21) Appl. No.: 11/074,734

(22) Filed: Mar. 9, 2005

(65) Prior Publication Data

US 2006/0020108 A1    Jan. 26, 2006

(30) Foreign Application Priority Data

Jul. 22, 2004    (TW) ............................... 93121838 A

(51) Int. Cl.
*D02D 3/00*     (2006.01)
*C08F 20/00*    (2006.01)

(52) U.S. Cl. .................. 428/364; 528/274; 528/275; 528/278; 528/282; 528/308.6; 528/502; 528/503; 525/437; 524/777; 524/779; 428/364; 428/402

(58) Field of Classification Search ............... 528/274, 528/275, 278, 282, 308.6, 502, 503; 525/437; 524/777, 779; 428/364, 402; 264/176.1
See application file for complete search history.

(56) References Cited

U.S. PATENT DOCUMENTS

| 5,561,183 A | 10/1996 | Kwon et al. |
| 6,124,221 A | 9/2000 | Gabbay |
| 6,669,882 B1 | 12/2003 | Seok |

FOREIGN PATENT DOCUMENTS

CN    1425704 A    6/2003

*Primary Examiner*—Samuel A. Acquah
(74) *Attorney, Agent, or Firm*—Rabin & Berdo, P.C.

(57) ABSTRACT

A method for manufacturing antibacterial polyester master batches and fibers containing nano-silver particles, the method includes the acts of: mixing a reducing agent, glycol and a silver precursor together to compose a first mixture; esterifying terephthalic acid and glycol to compose a second mixture containing block polymers; mixing the first and second mixtures to make the block polymers further polymerize to achieve a polyester liquid containing nano-silver particles; optionally, cooling the polyester liquid to solidify; and selectively, granulating the solidified polyester to obtain a polyester master batches or melting spinning the polyester to obtain polyester fibers. By reducing the silver ions during polymerizing reaction, the reduced silver particles are separated by polymerized polyester molecules so that the silver particles are evenly distributed inside the polyester master batches without coagulation.

17 Claims, 1 Drawing Sheet

METHOD FOR MANUFACTURING ANTIBACTERIAL POLYESTER MASTER BATCHES AND FIBERS BOTH CONTAINING NANO-SILVER PARTICLES

BACKGROUND OF THE INVENTION

1. Field of the Invention

The present invention relates to a method for manufacturing antibacterial polyester master batches and antibacterial polyester fibers, and more particularly to a method for manufacturing the polyester master batches and fibers containing nano-silver particles.

2. Description of Related Art

Antibacterial products are becoming increasingly popular because of the high standard of hygiene requirements in our daily lives. This trend extends to the textile industry and had a great development in manufacturing anti-bacterial fibers and cloth.

Antibacterial agents are basically cataloged into two different types, one is an organic antibacterial agent and the other is an inorganic antibacterial agent. An example of the organic antibacterial agent is quaternary ammonium salt, which has poor thermal endurance and can not be applied in thermal processing of plastic products or fiber spinning.

The inorganic antibacterial agents are usually some carriers (such as zeolite) with metal ions (such as $Ag^+$, $Zn^{2+}$, $Cu^{2+}$) or some nano-metal particles (such as nano-silver particles), both of which are referred to as effective particles in the following description (reference to U.S. Pat. No. 6,124,221). When manufacturing an antibacterial textile, one method is that the fibers usually are soaked into the inorganic antibacterial agents to attach the carriers or nano-metal particles on surfaces of the fibers. Therefore, the effective particles of the antibacterial inorganic agents are easily washed out during laundering and also cause allergic reactions to users. Another method of manufacturing the antibacterial fibers is by mixing the inorganic antibacterial agents and the polyester and then extruding to form fibers with effective particles (reference to U.S. Pat. No. 5,561,183 and U.S. Pat. No. 6,669,882). However, the antibacterial fibers made by this method are manufactured at low speed and can not be produced on a large scale. Still another method of using the inorganic antibacterial agents is to use effective particles of zeolite, titanium oxide, silver or zinc. After the effective particles are ground, the effective particles are evenly dispersed in a glycol solution. Those effective particles are combined with monomers in an esterification reaction and then the monomers are polymerized to form the antibacterial polyester master batches (reference to China patent No. CN1425704). However, it is not easy to evenly disperse the effective particles of inorganic antibacterial agents in the glycol solution and the manufacturing cost of this method is relatively high.

The present invention has arisen to mitigate or obviate the disadvantages of the conventional methods for manufacturing antibacterial master batches and fibers.

SUMMARY OF THE INVENTION

The main objective of the present invention is to provide a method for manufacturing antibacterial polyester master batches and fibers, which has simplified processes and low manufacturing cost.

In order to achieve the main objective as described above, the method comprises the following acts of:

mixing a reducing agent, glycol and a silver precursor together to compose a first mixture;

esterifying terephthalic acid (TPA) and glycol to compose a second mixture containing block polymers of esterification;

mixing the first and second mixtures to make the block polymers further polymerize to achieve a polyester liquid containing nano-silver particles;

optionally, cooling the polyester liquid to solidify; and selectively, granulating the solidified polyester to obtain ester master batches or melting spinning the polyester to obtain polyester fibers.

By reducing the silver ions during polymerization reaction, the reduced silver particles are separated by polymerized polyester molecules so that the silver particles are evenly dispersed inside the polyester master batches without coagulation.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
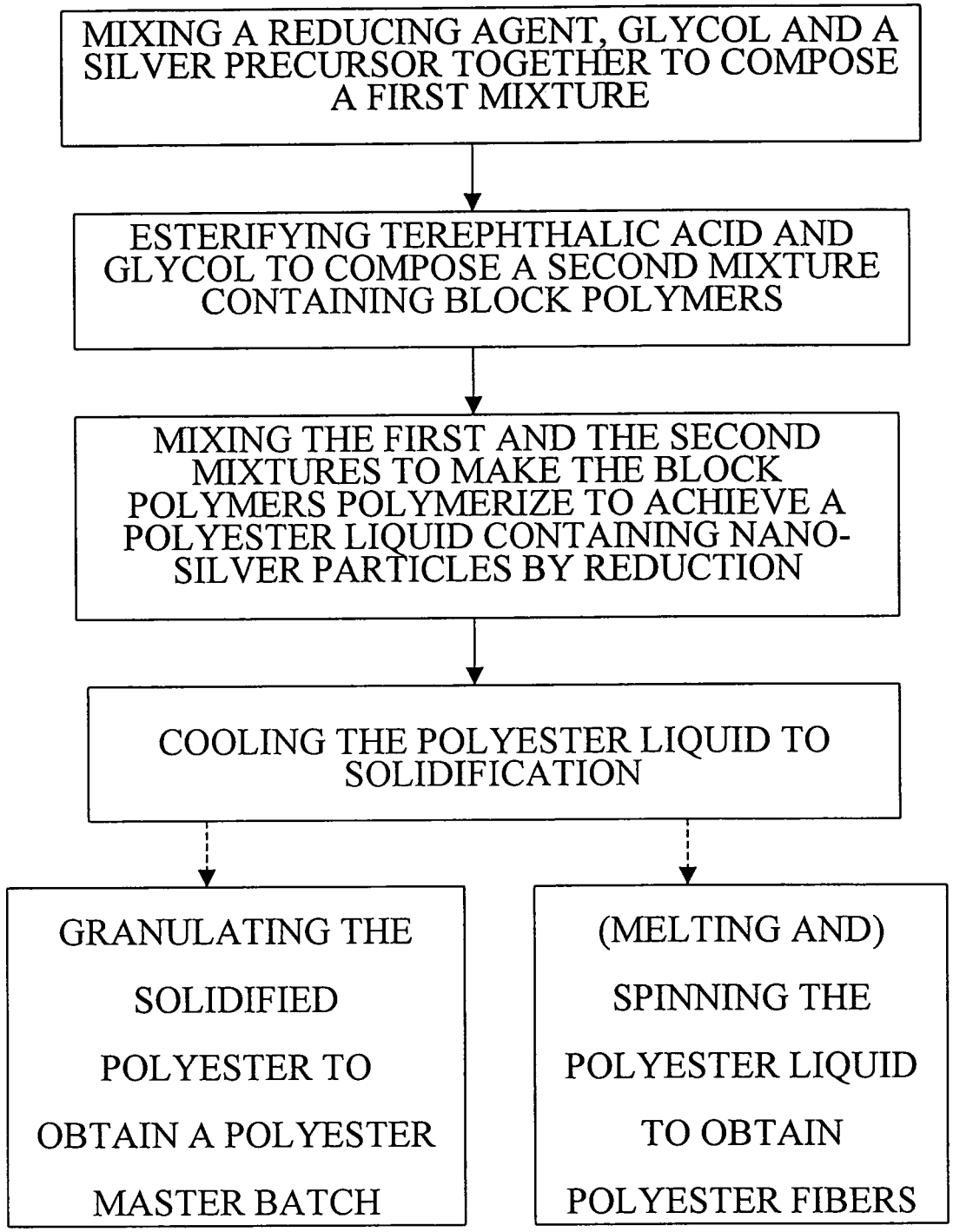
FIG. 1 is a series of schematically illustrating blocks in accordance with the present invention.

With reference to FIG. 1, a method for manufacturing antibacterial polyester master batches and fibers containing nano-silver particles in accordance with the present invention is shown, wherein the method comprises acts of:

mixing a reducing agent, glycol and a silver precursor together to compose a first mixture;

esterifying terephthalic acid (TPA) and glycol to compose a second mixture containing block polymers of esterification;

mixing the first and second mixtures to make the block polymers further polymerize to achieve a polyester liquid containing nano-silver particles;

optionally, cooling the polyester liquid to solidify; and selectively, granulating the solidified polyester to obtain polyester master batches or spinning the polyester to obtain polyester fibers.

Moreover, the esterifying act composing the second mixture can be substituted by simply using the esterification product such as dimethyl terephthalate (DMT) in the second mixture.

Because the silver ion from the silver precursor is reduced when the block polymers are polymerizing at the same time, the reduced nano-silver particles are separately enclosed by the polymerized polyester molecules to evenly disperse in the polyester master batches.

In the act of mixing a reducing agent, glycol and a silver precursor together to compose a first mixture, the reducing agent makes the silver ions from the silver precursor to reduce under a certain temperature. The silver precursor is selected from the group consisting of silver acetate, silver nitrite, silver nitrate, silver chloride, and silver sulfate. The reducing agent is selected from the polyvinyl pyrrolidone, sodium citrate, sodium hydroborate, hydrazinium hydroxide, and ethylene glycol. The operationally reducing temperature range is between 250 and 350° C. The reducing time is about 5 to 12 hours.

Detailed description and other operational conditions of each act in the method for manufacturing antibacterial polyester master batches are illustrated in the actual example. The proportion of each agent can be obtained by calculating the weight, molecular proportion, or the volume of every agent in the mixtures.

Firstly, 490 g of polyvinyl pyrrolidone was dissolved in 7 L of glycol. Then, 78.74 g of silver nitrate was added into the glycol to compose the first mixture of glycol solution containing silver ions.

Secondarily, 87 kg of terephthalic acid was mixed with 42 kg of glycol and a catalyst of antimony acetate in an esterifying tank to obtain the second mixture. The esterification reaction was carried out under 1.5 to 2.5 atm at 260° C. until 17.5 kg water was generated during the esterification reaction. Thereby, the terephthalic acid and glycol molecules were combined together to form BHET (Dis-β-hydroxy-ethyl-terephalate) oligomer, i.e. the block polymer, in the esterification reaction.

Thirdly, BHET oligomer was transferred into a polymerizing tank. The polymerizing tank was de-pressurized by vacuum suction until 1 torr and then heated to 280° C. to start the polymerization reaction. An agitator stirred the second mixture when the second mixture was transferred into the polymerizing tank to accelerate the polymerization reaction. When the intrinsic viscosity of BHET oligomer in the polymerization reaction reached 0.5 lb/g, the first mixture was added into the polymerizing tank and the pressure in the polymerizing tank suddenly and naturally increased to almost 1 atm. The vacuum suction kept working to reduce the pressure back to 1 torr again and the temperature was kept at 280° C. When the intrinsic viscosity of the reactants in the polymerization reaction reached 0.5 lb/g again, the polymerizing reaction was terminated.

Additionally, in another example that 101.7 kg of dimethyl terephthalate (DMT) was mixed with 21 kg of glycol in an esterifying tank to obtain the second mixture. The reaction was carried out under 1.5 to 2.5 atm at 260° C. until 62.2 kg methanol was generated during the reaction. Thereby, dimethyl terephthalate (DMT) and glycol molecules were combined together to form BHET (Dis-β-hydroxy-ethyl-terephalate) oligomer, i.e. the block polymer, in the reaction. Other operational procedures of BHET esterification in this example (DMT) are the same as ones in the former example (TPA), therefore, redundant descriptions are obviated hereafter.

The polymerized polyester in the polymerizing tank was in molten form and extruded by injecting 0.8 kg/cm$^2$ pressure of nitrogen gas into the polymerizing tank. The molten polyester was cooled by passing it through a water tank containing 10 to 12° C. water until the polyester was solidified. The solidified polyester was granulated by machine to obtain the polyester master batches containing nano-silver particles. Ideally, the concentration of the nano-sliver particles in the polyester master batches was 20 ppm to 500 ppm.

In order to verify antibacterial efficiency of the polyester master batches containing nano-silver particles in the above example, the polyester master batches was melted and spun by a spinning machine at 270° C. to obtain polyester fibers. Then, the polyester fibers were woven into knitted weave to proceed an antibacterial testing.

The knitted weave were tested for antibacterial ability with *Staphylococcus aureus* (AATCC-6538P) and *Klebsiella penumoniae* (AATCC-4352P) at standard of AATCC. Results of the test are listed as following:

| Species of bacterium | | Antibacterial ability of the stocking |
|---|---|---|
| *Staphylococcus aureus* (AATCC-6538P) | Bacteria inhibiting rate | >5.62 |
| | Bacteria eliminating rate | >2.88 |
| *Klebsiella penumoniae* (AATCC-4352P) | Bacteria inhibiting rate | 4.72 |
| | Bacteria eliminating rate | 1.98 |

According to antibacterial standards of JAFET (Japanese Association for the Function Evaluation of Textiles), the sample has a bacterial inhibiting ability when the bacterial inhibiting rate is larger than 2.2 and has a bacterial eliminating ability when the bacterial eliminating rate is larger than 0. According to this testing, the polyester fibers containing nano-silver particles have excellent bacterial inhibiting and eliminating abilities.

Although the invention has been explained in relation to its preferred embodiment, it is to be understood that many other possible modifications and variations can be made without departing from the spirit and scope of the invention as hereinafter claimed.

What is claimed is:

1. A method for manufacturing an antibacterial polyester master batches containing nano-silver particles, the method comprising acts of:
    mixing a reducing agent, glycol and a silver precursor together to compose a first mixture;
    esterifying terephthalic acid and glycol to compose a second mixture containing block polymers of esterification;
    mixing the first and second mixtures to make the block polymers further polymerize to achieve a polyester liquid containing nano-silver particles;
    cooling the polyester liquid to solidify; and
    granulating the solidified polyester to obtain the antibacterial polyester master batches.

2. The method as claimed in claim 1, wherein the silver precursor is selected from the group consisting of silver acetate, silver nitrite, silver nitrate, silver chloride and silver sulfate.

3. The method as claimed in claim 1, wherein the reducing agent is selected from the polyvinyl pyrrolidone, sodium citrate, sodium hydroborate, hydrazinium hydroxide, and ethylene glycol.

4. The method as claimed in claim 1, wherein the act of esterifying has a pressure range of 1.5 to 2.5 atm.

5. The method as claimed in claim 1, wherein the act of polymerizing has a pressure range of 1 torr to 1 atm.

6. The method as claimed in claim 4, wherein the act of esterifying has a temperature range of 250 to 300° C.

7. The method as claimed in claim 4, wherein the act of polymerizing has a temperature range of 250 to 300° C.

8. A method for manufacturing antibacterial polyester fibers containing nano-silver particles, the method comprises acts of:
    mixing a reducing agent, glycol and a silver precursor together to compose a first mixture;
    esterifying terephthalic acid and glycol to compose a second mixture containing block polymers of esterification;
    mixing the first and second mixtures to make the block polymers further polymerize to achieve a polyester liquid containing nano-silver particles;
    cooling the polyester liquid to solidify;
    granulating the solidified polyester to obtain antibacterial polyester master batches; and melting spinning the polyester master batches into the antibacterial polyester fibers.

9. The method as claimed in claim 8, wherein the silver precursor is selected from the group consisting of silver acetate, silver nitrite, silver nitrate, silver chloride and silver sulfate.

10. The method as claimed in claim 8, wherein the reducing agent is selected from the polyvinyl pyrrolidone, sodium citrate, sodium hydroborate, hydrazinium hydroxide, and ethylene glycol.

11. The method as claimed in claim 8, wherein the act of esterifying has a pressure range of 1.5 to 2.5 atm.

12. The method as claimed in claim 8, wherein the act of polymerizing has a pressure range of 1 torr to 1 atm.

13. The method as claimed in claim 11, wherein the act of esterifying has a temperature range of 250 to 300° C.

14. The method as claimed in claim 12, wherein the act of polymerizing has a temperature range of 250 to 300° C.

15. A method for manufacturing an antibacterial polyester master batches containing nano-silver particles, the method comprising acts of:

mixing a reducing agent, glycol and a silver precursor together to compose a first mixture;

obtaining a second mixture of dimethyl terephthalate;

mixing the first and second mixtures to make the dimethyl terephthalate further polymerize to achieve a polyester liquid containing nano-silver particles;

cooling the polyester liquid to solidify; and granulating the solidified polyester to obtain the antibacterial polyester master batches.

16. The method as claimed in claim 15, wherein the silver precursor is selected from the group consisting of silver acetate, silver nitrite, silver nitrate, silver chloride and silver sulfate.

17. The method as claimed in claim 15, wherein the reducing agent is selected from the polyvinyl pyrrolidone, sodium citrate, sodium hydroborate, hydrazinium hydroxide, and ethylene glycol.

* * * * *